United States Patent
Kamei et al.

(10) Patent No.: US 7,140,034 B2
(45) Date of Patent: Nov. 21, 2006

(54) PERIPHERAL FOR PORTABLE VIEWING APPARATUS AND BROADCASTING VIEWING SYSTEM

(75) Inventors: Yasukazu Kamei, Nara (JP); Kazuhiro Ieda, Osaka (JP); Tsuneyasu Inukai, Gifu (JP); Ichiro Kajitani, Gifu (JP); Yukinori Tokazu, Gifu (JP); Ko Matsuoka, Gifu (JP); Tetsutaka Yabuta, Osaka (JP); Naoaki Mitsui, deceased, late of Gifu (JP); by Chieko Mitsui, legal representative, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 116 days.

(21) Appl. No.: 10/252,559

(22) Filed: Sep. 24, 2002

(65) Prior Publication Data

US 2003/0059197 A1    Mar. 27, 2003

(30) Foreign Application Priority Data

Sep. 26, 2001  (JP)  ............................. 2001-293169

(51) Int. Cl.
*H04N 7/16* (2006.01)
*H04N 7/173* (2006.01)
*H04N 7/14* (2006.01)
*A63F 9/24* (2006.01)
*G06F 19/00* (2006.01)

(52) U.S. Cl. ...................... 725/153; 725/134; 725/142; 348/14.02; 463/43

(58) Field of Classification Search ................. 725/81, 725/82, 85, 74, 78, 134, 142, 152, 153; 348/14.02, 348/836; 386/38, 45, 117, 118, 125; 463/40, 463/43, 44, 45

See application file for complete search history.

(56) References Cited

U.S. PATENT DOCUMENTS 6,263,503 B1 *   7/2001   Margulis ..................... 725/81

(Continued)

FOREIGN PATENT DOCUMENTS

JP          3-130023          12/1991

(Continued)

OTHER PUBLICATIONS

Copy of Office Action from the Japanese Patent Office dated Jan. 10, 2006 for the corresponding Japanese patent application.

(Continued)

*Primary Examiner*—Chris Kelley
*Assistant Examiner*—Joseph G. Ustaris
(74) *Attorney, Agent, or Firm*—Westerman, Hattori, Daniels & Adrian, LLP

(57) ABSTRACT

Broadcasting is received in a desk peripheral, to store coded video data in a memory card. A portable viewing apparatus decodes the coded video data stored in the memory card, to display video on a liquid crystal display panel. Channel selection information for receiving the broadcasting in the desk peripheral is fed from the memory card. The portable viewing apparatus stores the channel selection information in the memory card by user entry. The portable viewing apparatus is supplied with charging power from the desk peripheral.

6 Claims, 5 Drawing Sheets

U.S. PATENT DOCUMENTS

| | | | |
|---|---|---|---|
| 2001/0037502 A1* | 11/2001 | Kamemoto et al. | 725/55 |
| 2002/0028063 A1* | 3/2002 | Haneda et al. | 386/83 |
| 2002/0119800 A1* | 8/2002 | Jaggers et al. | 455/550 |
| 2003/0028883 A1* | 2/2003 | Billmaier et al. | 725/46 |
| 2003/0061610 A1* | 3/2003 | Errico | 725/46 |

FOREIGN PATENT DOCUMENTS

| | | |
|---|---|---|
| JP | 11-220724 | 8/1999 |
| JP | 11-346166 | 12/1999 |
| JP | 2000-059717 | 2/2000 |
| JP | 2001-101356 | 4/2001 |
| JP | 2002-064782 | 2/2002 |
| JP | 2002-262220 | 9/2002 |
| WO | WO 00/72424 A1 | 11/2000 |

OTHER PUBLICATIONS

Office Action from the Chinese Patent Office in corresponding Chinese patent application dated Mar. 18, 2005.

Office Action from the Japanese Patent Office in the corresponding Japanese patent application No. 2001-293169 dated May 9, 2006.

* cited by examiner

PERIPHERAL FOR PORTABLE VIEWING APPARATUS AND BROADCASTING VIEWING SYSTEM

BACKGROUND OF THE INVENTION

Field of the Invention

The present invention relates to a peripheral for a portable viewing apparatus and a broadcasting viewing system.

Conventionally, portable television receivers have been provided. Such devices receive terrestrial wave analog broadcasting using built-in small-sized tuner, to display received video on liquid crystal display panels. In recent years, users can enjoy recorded video even at their destinations by recording on memory cards coded video data based on MPEG4 (Moving Picture Experts Group 4) and loading the memory cards in slots of the portable viewing apparatuses. The coded video data based on MPEG4 can be obtained by passing received video by normal television broadcasting or video picked up by handy cameras through MPEG4 encoders or downloading the video utilizing the Internet.

The users can thus easily enjoy the video at their destinations by highly developing video coding techniques and miniaturizing equipment. Further, equipment and broadcasting viewing systems which are superior in convenience of use are required.

In view of the foregoing circumstances, an object of the present invention is to provide a peripheral for a portable viewing apparatus and a broadcasting viewing system which are superior in convenience of use.

SUMMARY OF THE INVENTION

A peripheral for a portable viewing apparatus according to the present invention is a peripheral used in relation to a portable viewing apparatus capable of decoding coded video/audio data stored in a memory card to display video on a display as well as to output audio, characterized by comprising a charger for supplying charging power to the portable viewing apparatus; a tuner for receiving a broadcasting wave; means for acquiring the coded video/audio data on the basis of received broadcasting; and means for storing in the memory card the acquired coded video/audio data.

In the above-mentioned configuration, the broadcasting can be received in the peripheral, to store the coded video/audio data in the memory card, and the portable viewing apparatus can decode the coded video/audio data stored in the memory card, to display video on the display or output audio. Even if the portable viewing apparatus does not comprise a broadcasting receiving function, therefore, a user can view the broadcasting later but even at his or her destination, for example. Even if a charger is not separately provided for the portable viewing apparatus, the portable viewing apparatus can be charged in the peripheral.

A peripheral for a portable viewing apparatus according to the present invention is a peripheral used in relation to a portable viewing apparatus capable of decoding coded video/audio data stored in a memory card to display video on a display as well as to output audio, characterized by comprising a tuner for receiving a broadcasting wave; means for reading out channel selection information from the memory card; means for controlling the tuner on the basis of the channel selection information; means for acquiring the coded video/audio data on the basis of received broadcasting; and means for storing in the memory card the acquired coded video/audio data.

In the above-mentioned configuration, the broadcasting can be received in the peripheral, to store the coded video/audio data in the memory card, and the portable viewing apparatus can decode the coded video/audio data stored in the memory card, to display video on the display or output audio. Even if the portable viewing apparatus does not comprise a broadcasting receiving function, therefore, a user can view the broadcasting later but even at his or her destination, for example. Further, the channel selection information which is information as to which broadcasting is to be received in the peripheral is fed in the memory card, thereby eliminating the necessity of providing the peripheral with a button for channel selection by a user operation, for example.

A peripheral for a portable viewing apparatus according to the present invention is a peripheral used in relation to a portable viewing apparatus capable of decoding coded video/audio data stored in a memory card to display video on a display as well as to output audio, characterized by comprising a tuner for receiving a broadcasting wave; means for acquiring channel selection information by a wireless network or a wire network from the portable viewing apparatus; means for controlling the tuner on the basis of the channel selection information; means for acquiring the coded video/audio data on the basis of received broadcasting; and means for storing in the memory card the acquired coded video/audio data.

In the above-mentioned configuration, the broadcasting can be received in the peripheral, to store the coded video/audio data in the memory card, and the portable viewing apparatus can decode the coded video/audio data stored in the memory card, to display video on the display or output audio. Even if the portable viewing apparatus does not comprise a broadcasting receiving function, therefore, a user can view the broadcasting later but even at his or her destination, for example. Further, the channel selection information which is information as to which broadcasting is to be received by the peripheral is fed by the wireless network or the wire network from the portable viewing apparatus, thereby eliminating the necessity of providing the peripheral with a button for channel selection by a user operation, for example.

A broadcasting viewing system according to the present invention is a broadcasting viewing system comprising a portable viewing apparatus capable of decoding coded video/audio data stored in a memory card to display video on a display, and any one of the above-mentioned peripherals for the portable viewing apparatuses, characterized in that a video signal which is being received by the peripheral can be displayed as video on the display in the portable viewing apparatus. In order to transmit the video which is being received from the peripheral to the portable viewing apparatus, it is possible to use a wireless network, a wire network, and a video output terminal.

In the above-mentioned configuration, a user can currently view the video which is being broadcast in real time using the portable viewing apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described on the basis of FIGS. 1 to 5.

Figure 1:
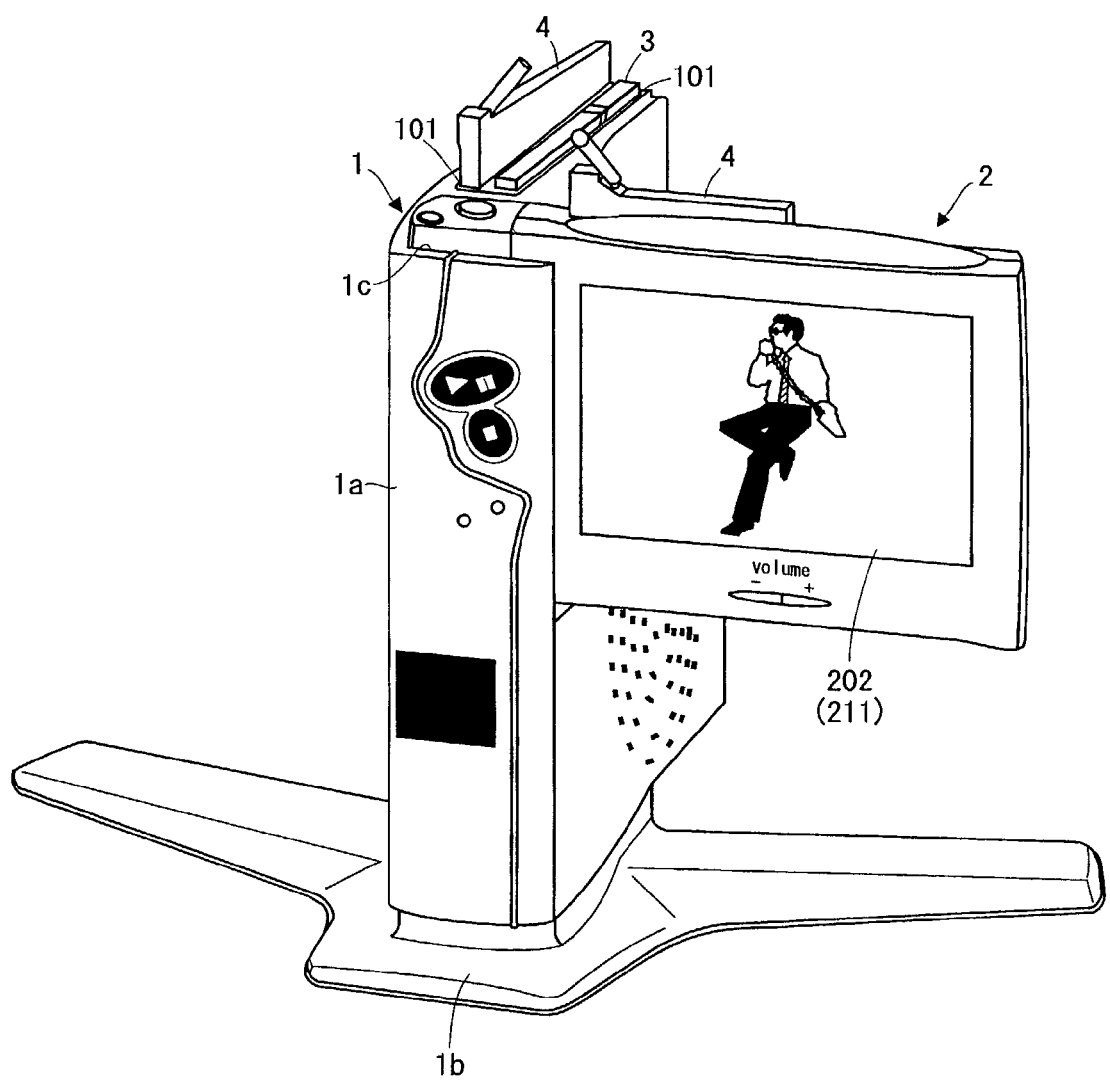
FIG. 1 is an external perspective view showing a state where a portable viewing apparatus and a peripheral constituting a broadcasting viewing system according to an embodiment of the present invention are connected together.
Figure 2:
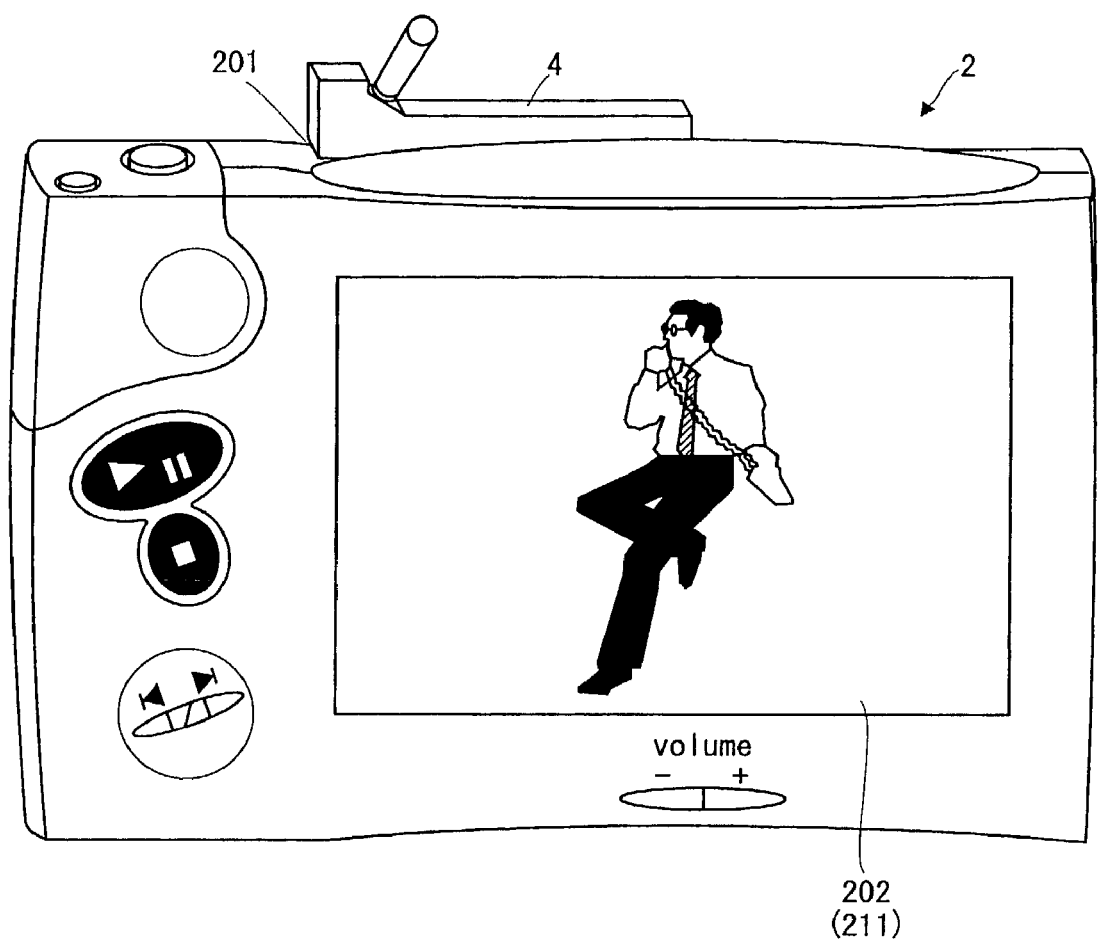
FIG. 2 is an external perspective view of the portable viewing apparatus.

A broadcasting viewing system according to the present invention comprises a desk peripheral 1 and a portable viewing apparatus 2, as shown in FIGS. 1 and 2. In the system, the desk peripheral 1 receives broadcasting (terrestrial wave analog broadcasting in the present embodiment), and coded video/audio data based on the received broadcasting is stored in a memory card 3 (e.g., Compact Flash Card (trade mark) or Multimedia Card (trade mark), etc.) inserted into a slot 101. A main body 1a of the desk peripheral 1 is designed so as to extend longitudinally, and has a leg 1b in its lower part, thereby preventing upsetting. The desk peripheral 1 is provided with a power supply button and an operation button related to viewing (play/pause, stop, feed, etc.), but is not provided with operation buttons for channel selection. A containing recess 1c is formed front side of the main body 1a of the desk peripheral 1, and can be mounted thereon with the portable viewing apparatus 2 inserted into the containing recess 1c. In the mounted state, the portable viewing apparatus 2 is charged from the desk peripheral 1.

The portable viewing apparatus 2 has an approximately square and flat shape, and is driven by a battery. The portable viewing apparatus 2 reads out coded video/audio data from the memory card 3 inserted into a slot 201, to display video on a liquid crystal display panel 202 as well as to output audio from an earphone 203. A touch panel 211 is affixed to the liquid crystal display panel 202, thereby making it possible to issue a desired instruction by performing a panel operation using a touch pen or the like. The operation buttons related to viewing (play/pause, stop, feed, sound volume, etc.) are provided in a frame.

Figure 3:
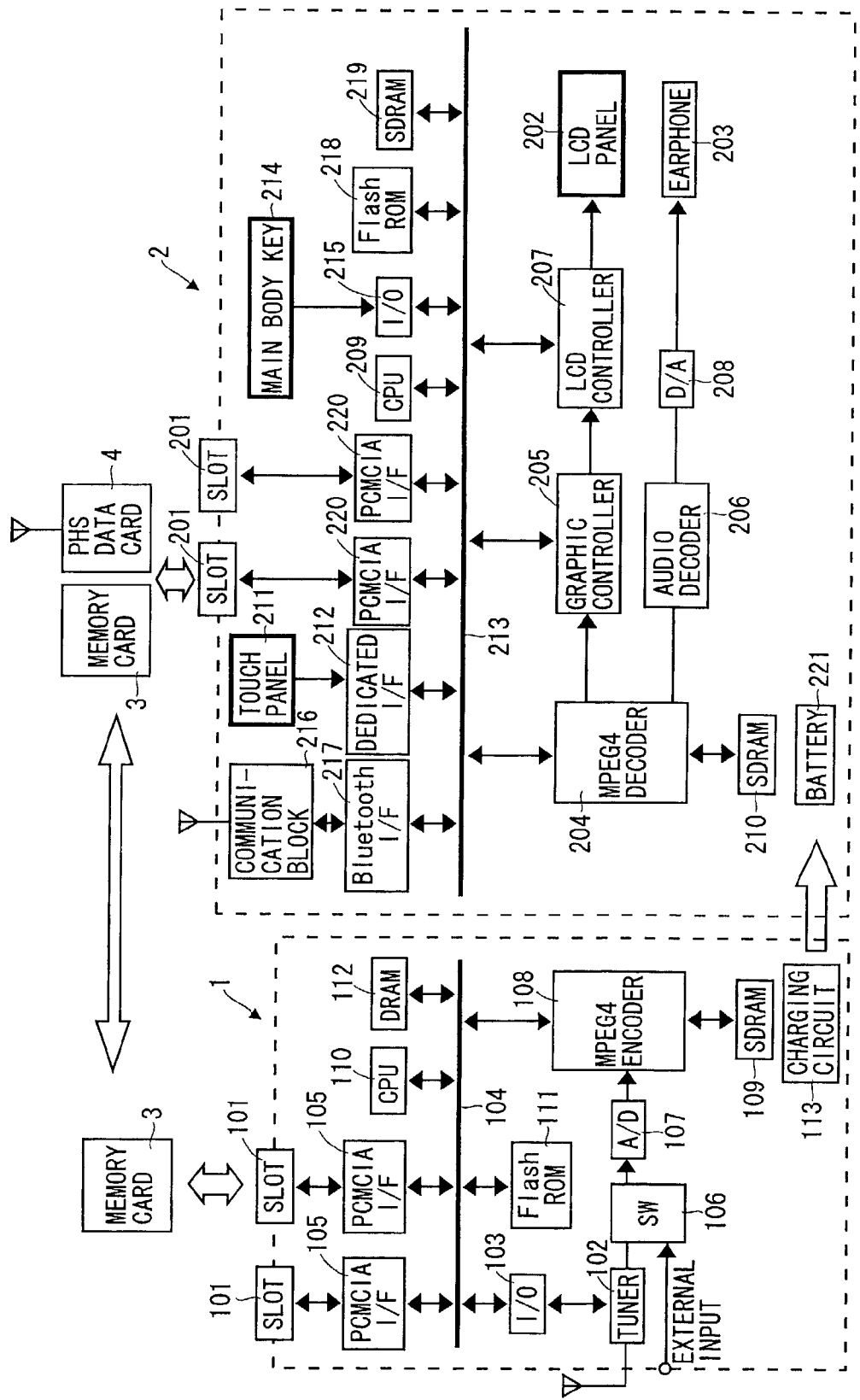
FIG. 3 is a block diagram showing the configuration of a portable viewing apparatus and a peripheral.

The circuit configuration of the desk peripheral 1 and the portable viewing apparatus 2 will be described in detail on the basis of FIG. 3.

The desk peripheral 1 will be first described. A tuner 102 receives terrestrial wave analog broadcasting, and outputs this broadcasting received signal. Channel selection information (channel information) for receiving arbitrary broadcasting and a command to start the tuner 102 are fed from a CPU 110 through an I/O (Input/Output) circuit 103 and a system bus 104. The CPU 110 receives channel selection command information (designated channel information, designated time information, etc.) by a user from the memory card 3 through the system bus 104, a PCMCIA (Personal Computer Memory Card International Association) interface 105, and the slot 101. A switch 106 has an input unit for inputting the broadcasting received signal and an input unit for inputting an external signal, and selects either one of the signals and supplies the selected signal to an A/D conversion circuit 107.

The A/D conversion circuit 107 converts an analog signal into a digital signal, and feeds the digital signal into an MPEG4 (Moving Picture Experts Group 4) encoder 108. The MPEG4 encoder 108 individually describes as an object each of a background in the video and characters in the background, for example, in accordance with MPEG4, adds shape information for handling each of the objects in the arbitrary shape and performs DCT processing, motion vector processing, or the like as in the MPEG2 to produce a video packet, and outputs a bit stream (coded video/audio data) composed of a series of video packets. As to audio, predetermined coding is performed, to incorporate this audio coded data into the bit stream. An SDRAM (Synchronous Dynamic RAM) 109 is utilized in the foregoing processing of the MPEG4 encoder The bit stream outputted by the MPEG4 encoder 108 is stored in the memory card 3 through the system bus 104, the PCMCIA interface 105, and the slot 101.

There are provided two sets of slots 101 and PCMCIA interfaces 105. A PHS (Personal Handy-phone System) data card 4 or the like can be mounted in addition to the memory card 3 on the slot 101.

A charging circuit 113 has a circuit for changing an alternating current from a power supply(outlet) to a direct current, for example, and supplies, when the portable viewing apparatus 2 is mounted on the desk peripheral 1, as shown in FIG. 1, charging power to the portable viewing apparatus 2 through a charging terminal (not shown).

The CPU 110 performs data transmission/receiving in a case where the PHS data card 4 is mounted on the slot 101, control of each of functional units based on the data, read/write control of a Flash ROM 111 and a DRAM 112, and so forth besides performing the above-mentioned operation control of the tuner 102 and processing (recording processing) for storing in the memory card 3 an output of the MPEG4 encoder 108.

Figure 4:
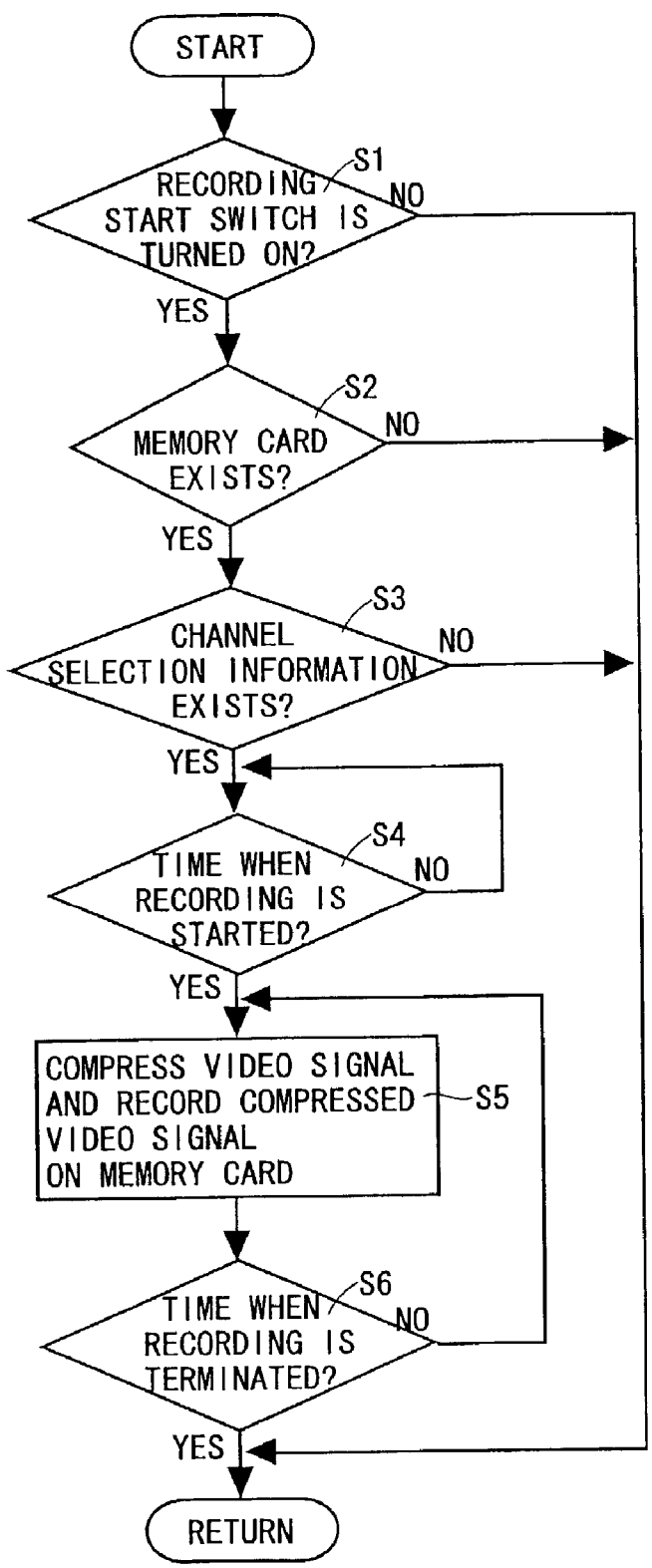
FIG. 4 is a flow chart simply showing recording processing by a peripheral.

FIG. 4 is a flow chart simply showing the contents of recording processing by the desk peripheral 1. When a power switch in the desk peripheral 1 is pressed (a recording start switch may be provided to judge an operation corresponding thereto), the presence or absence of the memory card 3 and the presence or absence of channel selection information are judged (steps S1, S2, and S3). If both the memory card 3 and the channel selection information exist, it is judged whether or not the time when recording is started in the channel selection information and the current time coincide with each other (step S4). At the time when recording is started, receiving processing is performed, to produce coded video/audio data and record the produced coded video/audio data on the memory card 3 (step S5) At the time when recording is terminated (YES at step S6), the recording processing is terminated.

Description is now made of the portable viewing apparatus 2. MPEG4 bit stream data stored in the memory card 3 is supplied to an MPEG4 decoder 204 through a PCMCIA interface 220 and a system bus 213. The MPEG4 decoder 204 decodes the bit stream data to find a quantization factor and a motion vector, and supplies to a graphic controller 205 video data obtained by performing inverse DCT conversion, motion compensation control based on the motion vector, and the like. The graphic controller 205 subjects video data (e.g., R, G, B data) to processing such as color tone adjustment. Further, the graphic controller 205 also performs processing for displaying on a liquid crystal display panel 202 characters, for example (an operation button, a menu screen, etc.) which it is instructed to output from a CPU 209. An audio decoder 206 receives coded audio data in a bit stream from the MPEG4 decoder 204, and decodes the received coded audio data, to produce audio data. An SDRAM 210 is utilized in the foregoing processing of the MPEG4 decoder An LCD controller 207 drives the liquid crystal display panel 202 on the basis of the video data supplied from the graphic controller 205. Further, a D/A (Digital-to-Analog) converter 208 receives the audio data outputted from the audio decoder 206 to subject the received audio data to digital-to-analog conversion, and produces an analog signal of a right (R) sound and an analog signal of a left (L) sound to feed the signals to an earphone 203.

Operation information related to a touch panel 211 is fed to the CPU 209 through a dedicated interface 212 and the system bus 213. The CPU 209 grasps the contents of a command by a correspondence between the above-mentioned operation information and display of the operation button or the like on the liquid crystal display panel 202, to perform required processing.

A main body key 214 corresponds to the above-mentioned operation button related to viewing (play/pause, stop, feed, etc.). The operation information related to the main body key 214 is fed to the CPU 209 through an interface 215 and the system bus 213. The CPU 209 performs necessary processing on the basis of the operation information.

In order to allow a wireless network, there are provided a communication block 216 and an interface (e.g., Bluetooth (trade mark)) 217. Further, there are also provided a flash ROM 218 and an SDRAM 219. A battery 221 is a secondary battery, and is supplied with power from the desk peripheral 1 to store the power.

The CPU 209 performs processing for the wireless network, data transmission/receiving in a case where the PHS data card 4 is mounted on the slot 201, control of each of functional units based on received data, read/write control of the Flash ROM 218 and the SDRAM 219, and so forth. Further, when the user performs received program designation (channel and time designation) using the touch panel 211 or the like, processing for storing the information in the memory card 3 is performed.

Figure 5:
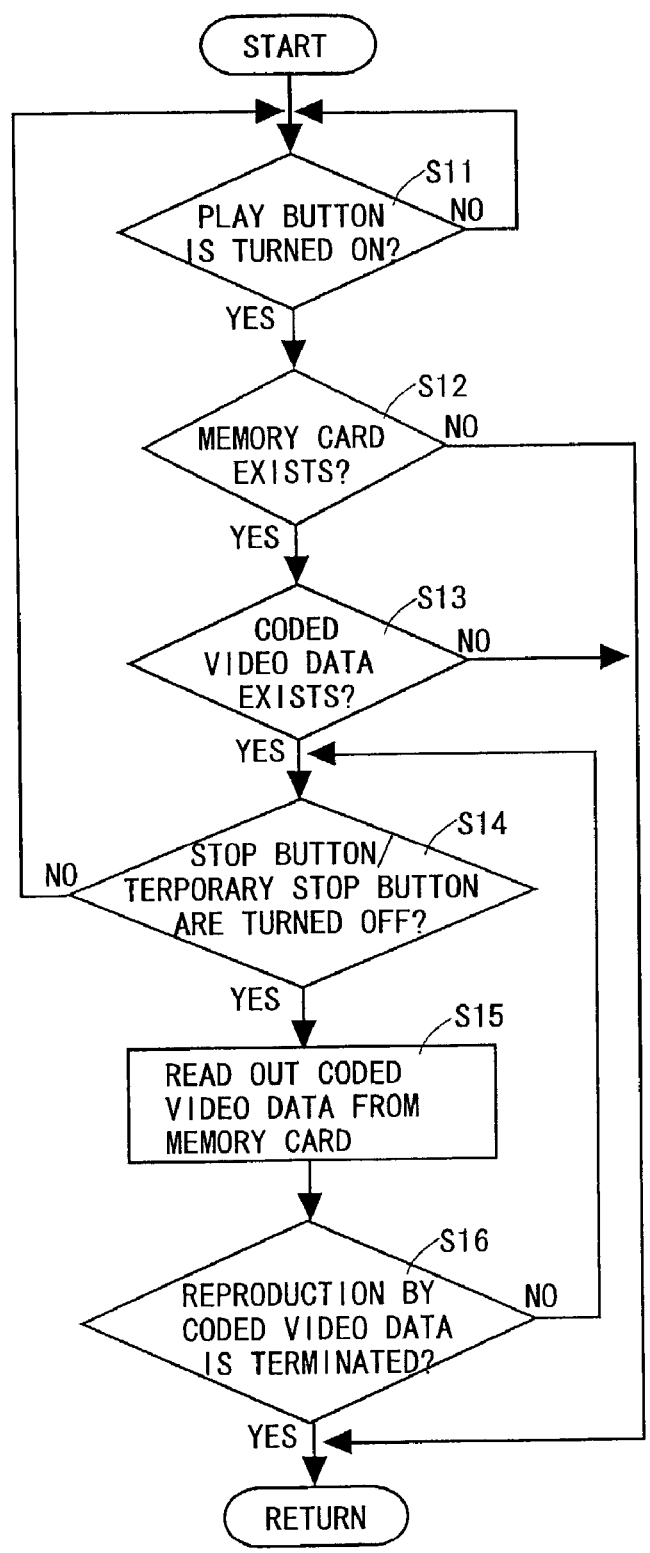
FIG. 5 is a flow chart simply showing reproduction processing by a portable viewing apparatus.

FIG. 5 is a flow chart simply showing the contents of reproduction processing performed by the portable viewing apparatus 2. When a play button in the portable viewing apparatus 2 is turned on, the presence or absence of the memory card 3 and the presence or absence of coded video/audio data are judged (steps S11, S12, S13). If both the memory card 3 and the coded video/audio data exist, the operating states of a stop button and a temporary stop button are judged (step S14). If the stop operation is not performed, the coded video/audio data is read out of the memory card 3 (step S15). If the reproduction by the coded video/audio data is terminated (YES in step S16), reproduction processing is terminated.

As described in the foregoing, the bit stream data based on the MPEG4 can be stored in the memory card 3 receiving the broadcasting in the desk peripheral 1, and the portable viewing apparatus 2 can decode the bit stream data stored in the memory card 3 and display video on the liquid crystal display panel 202. Even if the portable viewing apparatus 2 does not comprise a broadcasting receiving function, therefore, a user can view the broadcasting later but even at his or her destination, for example. Even if a charger is not separately provided for the portable viewing apparatus 2, the portable viewing apparatus 2 can be charged in the desk peripheral 1. Further, channel selection information which is information as to which broadcasting is to be received in the desk peripheral 1 is fed in the memory card 3. Accordingly, the desk peripheral 1 need not be provided with a button for channel selection by a user operation, for example.

A communication block and an interface, which are not illustrated, in the same standard as the communication block 216 and the interface (e.g., Bluetooth (trade mark)) 217 provided in the portable viewing apparatus 2 may be provided in the desk peripheral 1, to allow the wireless network between the desk peripheral 1 and the portable viewing apparatus 2. Consequently, the channel selection information can be also fed to the desk peripheral 1 by the wireless network from the portable viewing apparatus 2. The bit stream data based on the MPEG4 can be transmitted to the portable viewing apparatus 2 from the desk peripheral 1 by such a wireless network. Consequently, video which is being currently broadcast can be viewed in real time using the portable viewing apparatus 2. The desk peripheral 1 and the portable viewing apparatus 2 may be connected to each other by a wire network, and the channel selection information and the bit stream data may be sent out, as described above. Further, a composite video signal (which may be a component video signal) may be sent out to the portable viewing apparatus 2 via an AV terminal (or an S terminal, a D terminal, etc.) from the desk peripheral 1 instead of feeding the bit stream data based on the MPEG4 to the portable viewing apparatus 2 from the desk peripheral 1.

In a case where the broadcasting is viewed in real time in a state where the portable viewing apparatus 2 is mounted on the containing recess 1c in the desk peripheral 1, and the operation button in the portable viewing apparatus 2 is concealed by the desk peripheral 1, as shown in FIG. 1, an operation button may be arranged, similarly to the operation button in the desk peripheral 1, and the portable viewing apparatus 2 may be made operable on the side of the desk peripheral 1. Operation information for the operation button in the desk peripheral 1 can be sent out toward the portable viewing apparatus 2 using a wireless network or wire or a wire network. Further, the desk peripheral 1 may be provided with a speaker, to output audio in received broadcasting from the speaker in the desk peripheral 1, and display video by the liquid crystal display panel 202 in the portable viewing apparatus 2.

When the desk peripheral 1 receives the terrestrial wave digital broadcasting, the necessity of the MPEG4 encoder 108 can be eliminated. Data for EPG (Electronic Program Guide) display fed in the terrestrial wave digital broadcasting may be set out toward the portable viewing apparatus 2 using the wireless network or the wire network, to perform EPG display on the liquid crystal display panel 202 in the portable viewing apparatus 2, and feed channel selection information related to a program designated on the EPG to the desk peripheral 1 by a memory card or a wireless/wire network.

As described in the foregoing, according to the present invention, even if the portable viewing apparatus does not comprise the broadcasting receiving function, the user can view the broadcasting later but even at his or her destination using the memory card. Further, even if a charger is not separately provided for the portable viewing apparatus, the portable viewing apparatus can be charged in the peripheral. Further, channel selection information which is information as to which broadcasting is to be received in the peripheral is fed by the memory card or the wireless/wire network. Accordingly, the peripheral need not be provided with a button for channel selection by a user operation, for example. Further, a user can currently view the video which is being broadcast in real time by the portable viewing apparatus using the wireless network or the wire network.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a peripheral used in relation to a portable viewing apparatus capable of decoding coded video/audio data stored in a memory card to display video on a display as well as to output audio, the peripheral for the portable viewing apparatus comprising:
   a main body having a containing recess sized and adapted to receive and releasably retain at least a portion of the portable viewing apparatus such that when the containing recess receives and releasably retains the at least a portion of the viewing apparatus, electrical communication between the peripheral and the portable viewing apparatus is established;
   a charger for supplying charging power to said portable viewing apparatus;
   a tuner for receiving a broadcasting wave;
   means for acquiring the coded video/audio data on the basis of received broadcasting; and
   means for storing in the memory card the acquired coded video/audio data.

2. In a peripheral used in relation to a portable viewing apparatus capable of decoding coded video/audio data stored in a memory card to display video on a display as well as to output audio, the peripheral for the portable viewing apparatus comprising:
   a main body having a containing recess sized and adapted to receive and releasably retain at least a portion of the portable viewing apparatus such that when the containing recess receives and releasably retains the at least a portion of the viewing apparatus, electrical communication between the peripheral and the portable viewing apparatus is established;
   a tuner for receiving a broadcasting wave;
   means for reading out channel selection information from the memory card;
   means for controlling said tuner on the basis of said channel selection information;
   means for acquiring the coded video/audio data on the basis of received broadcasting; and
   means for storing in the memory card the acquired coded video/audio data.

3. In a peripheral used in relation to a portable viewing apparatus capable of decoding coded video/audio data stored in a memory card to display video on a display as well as to output audio, the peripheral for the portable viewing apparatus comprising:
   a main body having a containing recess sized and adapted to receive and releasably retain at least a portion of the portable viewing apparatus such that when the containing recess receives and releasably retains the at least a portion of the viewing apparatus, electrical communication between the peripheral and the portable viewing apparatus is established;
   a tuner for receiving a broadcasting wave;
   means for acquiring channel selection information by a wireless network or a wire network from said portable viewing apparatus;
   means for controlling said tuner on the basis of said channel selection information;
   means for acquiring the coded video/audio data on the basis of received broadcasting; and
   means for storing in the memory card the acquired coded video/audio data.

4. A broadcasting viewing system comprising:
   a portable viewing apparatus capable of decoding coded video/audio data stored in a memory card to display video on a display; and
   a peripheral for the portable viewing apparatus including a main body having a containing recess sized and adapted to receive and releasably retain at least a portion of the portable viewing apparatus such that when the containing recess receives and releasably retains the at least a portion of the viewing apparatus, electrical communication between the peripheral and the portable viewing apparatus is established; wherein
   video is being received by said peripheral and is being displayed on a display in the portable viewing apparatus.

5. The broadcasting viewing system according to claim 4, wherein the coded/video/audio data based on the video which is being received is transmitted to the portable viewing apparatus from the peripheral by a wireless network or a wire network.

6. The broadcasting viewing system according to claim 4, wherein the video signal which is being received is transmitted to the portable viewing apparatus from the peripheral using a video output terminal.

\* \* \* \* \*